July 26, 1949.  J. W. FLORIN  2,477,482
FLOATING PRECISION CUTTER

Filed Feb. 22, 1945  2 Sheets-Sheet 1

Inventor
John W. Florin
By Clarence A. O'Brien
and Harvey B. Jacobson
Attorneys

July 26, 1949.                J. W. FLORIN                2,477,482
                         FLOATING PRECISION CUTTER
Filed Feb. 22, 1945                                  2 Sheets-Sheet 2
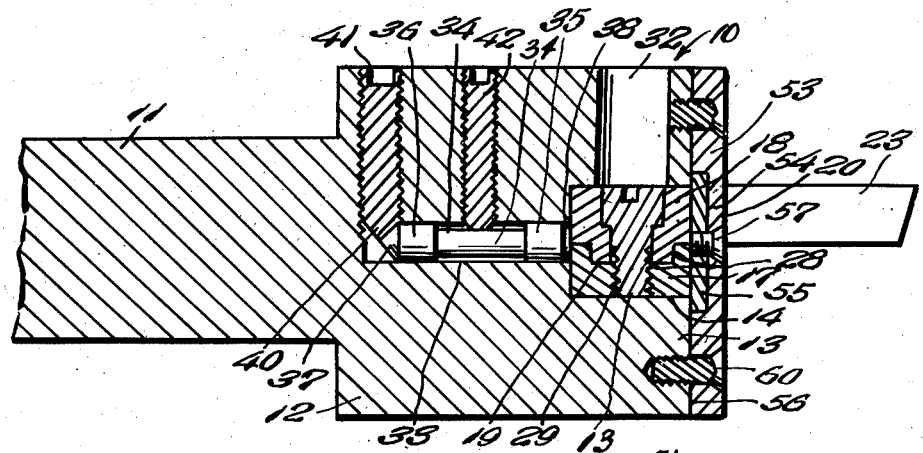
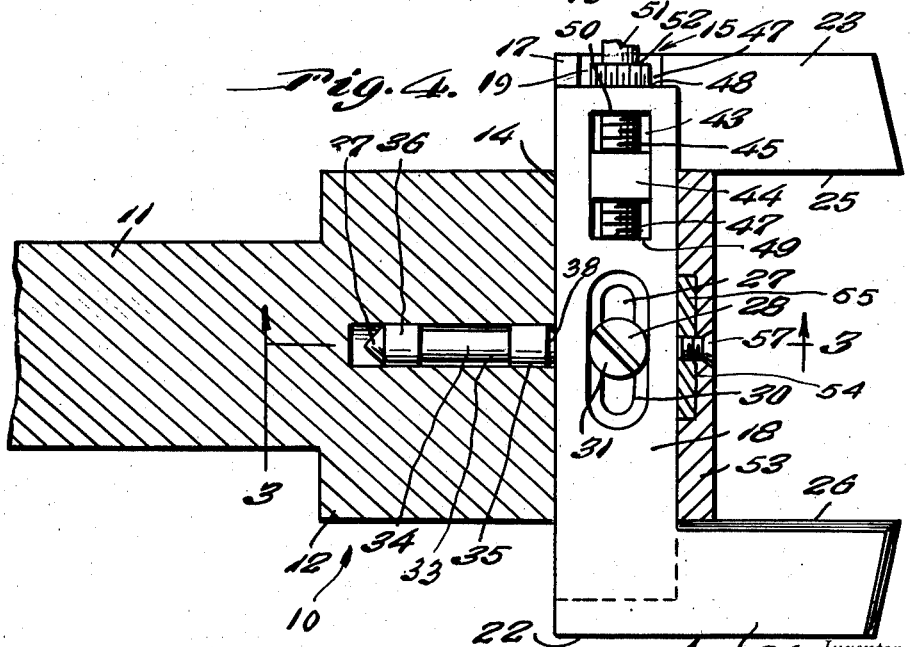
Inventor
John W. Florin
By Clarence A. O'Brien
and Harvey B. Jacobson
Attorneys Patented July 26, 1949

2,477,482

UNITED STATES PATENT OFFICE 2,477,482

FLOATING PRECISION CUTTER

John W. Florin, Detroit, Mich., assignor of fifty per cent to Irene J. Florin, Detroit, Mich.

Application February 22, 1945, Serial No. 579,275

5 Claims. (Cl. 29—105)

This invention relates to precision tools and has for its object to provide an adjustable floating precision outside diameter sizing cutter.

Another object of the invention is to provide a turning tool adapted for use on any lathe or machine which has lost its ability to constantly return to center.

A further object of the invention is to provide a pair of co-acting cutters and means for precision adjustment relative to one another.

Other features and advantages will become more readily apparent from the following description and the accompanying illustrative drawings in which:

Figure 3 is a sectional view taken on line 3—3 of Figure 4, and

Figure 4 is a sectional elevation of the tool.

Figure 1:
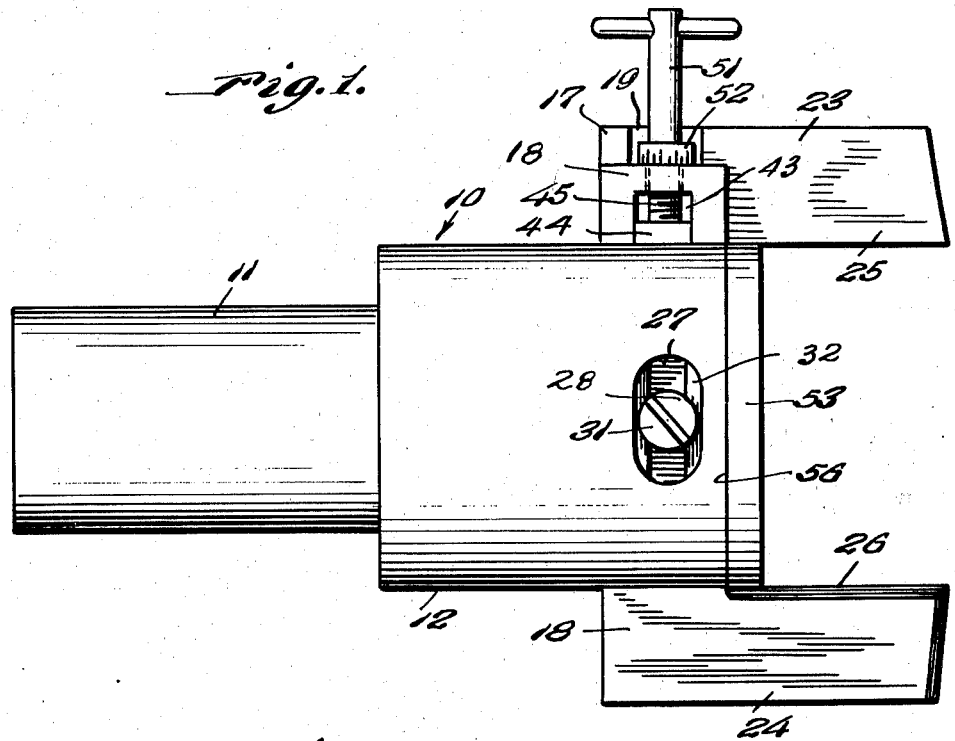
Figure 1 is a top plan view of my device.
Figure 2:
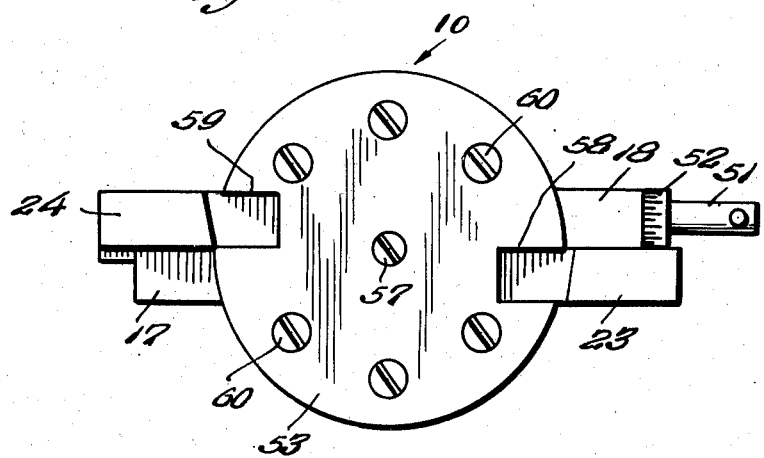
Figure 2 is an end view thereof.

The reference characters used in the drawings and specification indicate like parts throughout, and 10 represents my tool comprising a shank 11, having an integral enlarged head 12, with a transverse bifurcated end 13, forming a transverse slot 14, in which a pair of relatively adjustable cutters 23 and 24, are seated. These cutters are L-shaped and consist of shanks 17 and 18, the former having a groove 19, throughout its length and the latter a tongue 20, through its length and which tongue is slidably seated in said groove. Projecting at right angles from the outer opposite ends 21 and 22, of the shanks 17 and 18, are the cutter blades 23 and 24, the cutting edges 25 and 26, of which face one another.

The cutter shank 18, is provided centrally with an elongated slot 27, through which a set screw 28, slidably projects and the lower end of which is screwed into the threaded bore 29, in the shank 17. The slot 27, is countersunk providing a marginal shoulder 30, upon which the head 31, of said set screw seats in order to lock the members 17 and 18 in set position. A clearance bore 32, is provided in the head 12, whereby the screw 28, may be reached.

Projecting inwardly from the slot 14, and centrally thereof, is a smooth bore 33, within which is slidably seated a pin 34, having enlarged ends 35 and 36, the terminals 37 and 38 of which are conical. Formed in the rear walls of the shanks 17 and 18, is a centering notch (not shown) within which the point 38, seats, whereby the cutter members may be held in perfect alignment whether rigid, or afloat. The conical terminal 37, is in engagement with the similarly formed terminal 40, of a screw 41, threaded through the head 12, and whereby the pin 34, may be adjusted. A set screw 42, threaded through said head bears upon the pin 34, whereby the pin may be held in fixed position.

The shank 18, is provided with a slot 43, extending therethrough into which seats a slide member 44, formed as an integral extension from shank 17, this member is provided with a transverse threaded bore for receiving the micrometer screw 45, the terminals 46 and 47, of which bear against the terminal ends 48 and 49, of the slot 43, whereby the members 17 and 18 may be adjusted forward and backward relative to one another. The end wall 50, of member 18, is provided with a bore (shown dotted in Figure 1) for an Allen adjusting wrench 51, on which is a micrometer 52, whereby the cutter may be set to a nicety.

The cutter members 17 and 18, are held in the head 12, by means of a cap plate 53, within the annular recess 54, of which is seated a disk 55, bearing against the outer sides of members 17 and 18. The cap has sufficient clearance between it and the end wall 56, of member 12, to permit free floating of the cutter members. The pressure of disk 55, against the cutter shanks 17 and 18, is regulated by a screw 57. The cap 53, is provided with peripheral slots 58 and 59, in which the blades 23 and 24 are adjustably slidable. Screw 60, secures the cap 53, to said head 12.

My above described cutter may not only be adjusted for precision work, but when the blades are properly ground will produce a mirror like finish. The cutters can readily be adjusted without removing the cap 53, but merely by loosening screw 28 and adjusting the cutter by means of the micrometer screw. Furthermore, with my floating cutter arrangement it will not be necessary to return to exact center as is necessary with other turning tools. This tool when used correctly will enable an operator to hold and maintain size on any outside diameter to the ten thousandths of an inch.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted to, in actual practice, if desired.

Having now described my invention that which I claim as new and desire to procure by Letters Patent is:

1. A tool of the character described including a head, a pair of adjustable cutter members seated in the head having tongue and groove connection with one another, integrally formed cutter blades on said members, means for floating centering of said members on the head, means for fixedly connecting said members, means for mirometry adjustment of said members, said blades being at right angles to said members, and having their cutting edges facing one another.

2. A tool of the character described including a head, a pair of adjustable cutter members seated in the head having tongue and groove connection with one another, integrally formed cutter blades on said members, means for floating centering of said members on the head, means for fixedly connecting said members, means for micrometry adjustment of said members, and said blades being at right angles to said members.

3. The described tool including a shank having an enlarged bifurcated head, a pair of L-shaped cutter members the shanks of which are mounted in the slot between the furcations of the head, the cutting heads of said members projecting horizontally from the head having cutting edges facnig one another, a pin having conical ends seated in a bore in the head and adapted for adjustable engagement with said shanks, means for holding the pin in fixed position for rigid connection with the shanks, and means whereby the pin may have floating movement relative to the shanks.

4. The described tool including a shank having an enlarged bifurcated head, a pair of L-shaped cutter members the shanks of which are mounted in the slot between the furcations of the head, the cutting heads of said members projecting horizontally from the head having cutting edges facing one another, a pin having conical ends seated in a bore in the head and adapted for adjustable engagement with said shanks, and means for holding the pin in fixed position for rigid connection with the shanks.

5. The described tool including a shank having an enlarged bifurcated head, a pair of L-shaped cutter members the shanks of which are mounted in the slot between the furcations of the head, the cutting heads of said members projecting horizontally from the head having cutting edges facing one another, and a pin having conical ends seated in a bore in the head and adapted for adjustable engagement with said shanks.

JOHN W. FLORIN.

REFERENCES CITED

The following references are of record in the file of this patent:

UNITED STATES PATENTS

| Number | Name | Date |
| --- | --- | --- |
| 296,219 | Rath | Apr. 1, 1884 |
| 457,536 | Jennings | Aug. 11, 1891 |
| 667,311 | Henn | Feb. 5, 1901 |
| 931,593 | Garner | Aug. 17, 1909 |
| 1,290,206 | Howk | Jan. 7, 1919 |
| 1,853,971 | Giern | Apr. 12, 1932 |
| 2,003,402 | Thomas | June 4, 1935 |
| 2,253,028 | Hassig | Aug. 19, 1941 |